United States Patent [19]

Kroll

[11] 3,842,788

[45] Oct. 22, 1974

[54] REVERSIBLE TRANSMISSION
[75] Inventor: Raymond A. Kroll, Kenosha, Wis.
[73] Assignee: Outboard Marine Corporation, Waukegan, Ill.
[22] Filed: Aug. 30, 1973
[21] Appl. No.: 393,008

[52] U.S. Cl.............. 115/34 R, 74/711, 74/739, 74/378, 192/55
[51] Int. Cl........................... B63h 5/12, F16h 3/38
[58] Field of Search............ 115/34 R, 35, 17, 18 R; 192/51, 55; 74/339, 710, 710.5, 711, 650, 378; 64/15 C

[56] References Cited
UNITED STATES PATENTS
| | | | |
|---|---|---|---|
| 1,300,398 | 4/1919 | Jaeger | 192/55 |
| 2,672,115 | 3/1954 | Conover | 115/17 |
| 3,585,873 | 6/1971 | Austen | 192/51 |
| R22,767 | 6/1946 | Starkey | 192/51 |

Primary Examiner—Trygve M. Blix
Assistant Examiner—Charles E. Frankfort
Attorney, Agent, or Firm—Michael, Best & Friedrich

[57] ABSTRACT

Disclosed herein is a marine propulsion device including a reversible clutch or transmission which includes a pair of facing drive gears rotatably mounted on a propeller shaft and having drive lugs, a shiftable driver mounted to the propeller shaft between the drive gears for axial movement relative to and in common rotation with the propeller shaft, a pair of clutch dogs rotatably carried on the propeller shaft driver and having drive lugs which are drivingly engageable with drive lugs on the corresponding drive gears, and means for selectively shifting the propeller shaft driver axially on the propeller shaft to drivingly engage a clutch dog with the corresonding drive gear. Separate spirally wound, torsion springs located in encircling relation to the propeller shaft connect each clutch dog to the propeller shaft driver. Upon initial engagement of a clutch dog with a rotating drive gear, the corresponding torsion spring is wrapped up so that the torque transmitted by the clutch dog to the propeller shaft driver gradually increases from a no-torque to a full-torque condition. The torsion springs are preferably supported on a resilient pad or cushion which is compressed as the spring becomes tightly wound.

10 Claims, 3 Drawing Figures

PATENTED OCT 22 1974　　　　　　　　　　　　　　　3,842,788
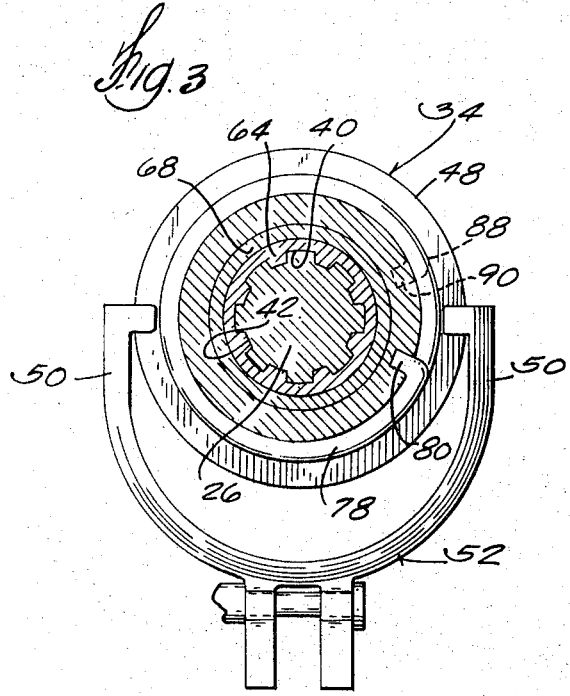
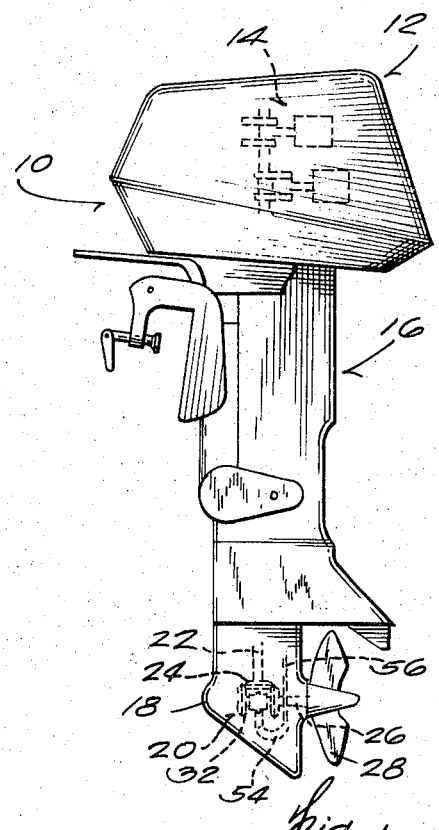
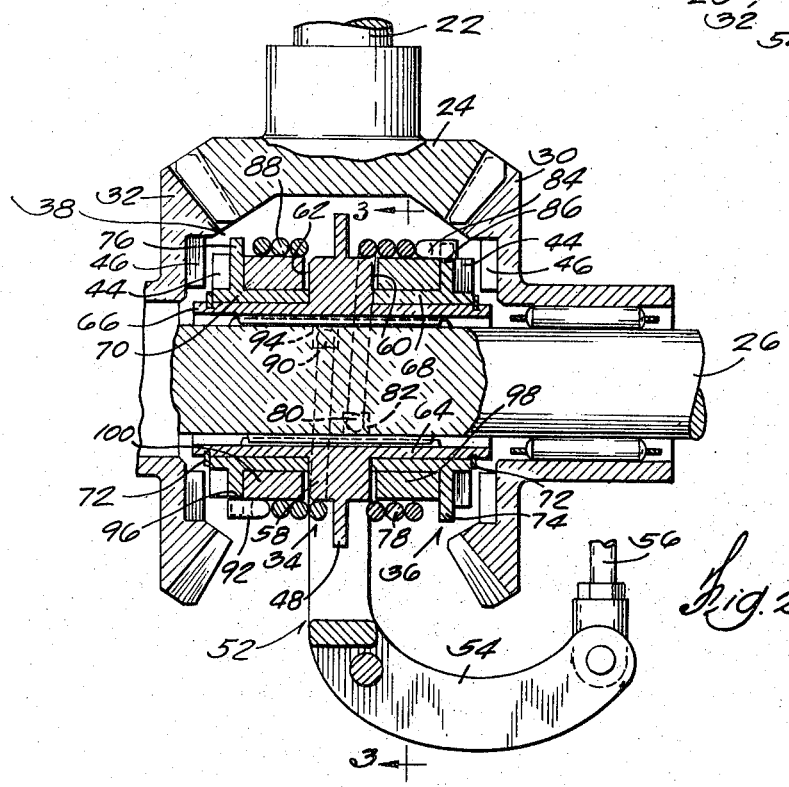

REVERSIBLE TRANSMISSION

BACKGROUND OF THE INVENTION

This invention relates to transmissions and, more particularly, to reversible clutches or transmissions for marine propulsion devices and the like.

Outboard motors and other marine propulsion devices have commonly employed reversible clutches or transmissions which connect the output shaft of an engine to a driven shaft, i.e., the propeller shaft, to provide neutral, forward drive and rearward drive operations. Such transmissions have typically included a pair of opposed, axially spaced drive gears and a clutch dog which is splined to the propeller shaft and can be selectively shifted axially into engagement with the drive gears. The shiftable clutch dog has driving lugs which engage complementary driving lugs on the drive gears. When the driving lugs become engaged, the drive gear drives the clutch dog which in turn drives the driven or propeller shaft. The initial engagement of the driving lugs can produce a considerable shock or impact loading on the clutch dog driving lugs, particularly when the power being transmitted by a rapidly rotating drive gear and the initial load on the propeller shaft is high, with resultant undue wear and/or fracture of the clutch dog driving lugs.

Examples of prior reversible transmissions for marine propulsion devices are disclosed in the following U.S. patents and patent applications:

Shimanckas — U.S. Pat. No. 3,216,392 — issued Nov. 9, 1965
Yourich — U.S. Pat. No. 3,386,546 — issued June 4, 1968
Shimanckas — U.S. Pat No. 3,447,504 — issued June 3, 1969
Blanchard — U.S. Pat. No. 3,455,420 — issued July 15, 1969
Shimanckas — U.S. Pat. No. 3,467,051 — issued Sept. 16, 1969
Strang — U.S. Pat. No. 3,489,120 — issued Jan. 13, 1970
Shimanckas — U.S. Pat. No. 3,556,041 — issued Jan. 19, 1971
Shimanckas — Ser. No. 811,829 — filed Apr. 1, 1969, now U.S. Pat. No. 3,583,357

SUMMARY OF THE INVENTION

The invention provides a transmission which is particularly adaptable for a marine propulsion device, such as an outboard motor or a stern drive unit, and which includes a drive means carried on a driven shaft, such as a propeller shaft, for axial movement relative to the driven shaft and for common rotation with the driven shaft, a clutch dog rotatably mounted on the drive means for common axial movement therewith and having drive lugs which engage complementary drive lugs on a drive gear to drivingly connect the clutch dog and the drive gear for common rotation, means for selectively moving the drive means axially on the drive shaft to move the clutch dog into driving engagement with the drive gear, and means for connecting the clutch dog to the drive means so as to afford rotation of the drive means in response to rotation of the clutch dog.

In further accordance with the invention, the means for connecting the clutch dog to the drive means for rotation of the latter in response to rotation of the former is arranged so that, upon initial engagement of the clutch dog with the drive gear, there is a gradual increase in the torque applied by the clutch dog to the drive means, thereby reducing the initial shock or impact load on the clutch dog drive lugs. More specifically, such connecting means initially provides a flexible connection between the clutch dog and the drive means so there is some relative rotation therebetween during the initial application of torque by the clutch dog to the drive means and, after this initial application of torque, provides a substantially rigid connection between the clutch dog and the drive means.

In still further accordance with one embodiment of the invention, the connecting means comprises a spirally wound torsion spring which is affixed at the opposite ends to the clutch dog and the drive means and which is disposed to begin transmitting partial torque from the clutch dog to the drive means and to become gradually wrapped up during the initial rotation of the clutch dog after the clutch dog is drivingly engaged with the drive gear. The torsion spring eventually becomes completely wrapped up to thereby establish a substantially rigid connection between the clutch dog and the drive means and full torque is thereafter transmitted from the clutch dog to the drive means. The relative rotation between the clutch dog and the drive means during the time the torsion spring is being wrapped up results in a gradual change from a no-load condition to a full load condition on the clutch dog drive lugs.

In accordance with another embodiment of the invention, the torsion spring is supported on a resident pad or cushion. This pad or cushion is compressed by the torsion spring as it wraps up and the time between no-load and full-load conditions on the clutch dog drive lugs is delayed further.

A principal feature of the invention is the provision of a marine propulsion device having a reversible transmission which is capable of being shifted at relatively high rotary speeds without undue wear and damage.

Another principal feature of the invention is the provision of a reversible transmission which is particularly adaptable for use in marine propulsion devices and the like and which includes clutch dogs and is arranged so that there is a gradual increase in the initial torque transmitted by a clutch dog to a driven shaft after a clutch dog is drivingly engaged with a rotating drive gear.

Another principal feature of the invention is the provision of such a marine propulsion device in which the clutch dogs are connected to a shiftable drive means carried on the drive shaft by means which permits some relative rotation between the clutch dog and the drive means during the initial transmission of torque by the clutch dog.

Other features and advantages of the invention will become apparent upon reviewing the following detailed description, the drawing and the appended claims.

BRIEF DESCRIPTION OF THE DRAWINGS

FIG. 1 is a side elevational view, partially broken away, of a marine propulsion device incorporating a reversible clutch transmission arranged in accordance with the invention.

FIG. 2 is an enlarged view, partially in cross section, of the transmission shown in FIG. 1.

FIG. 3 is a sectional view taken along the line designated 3—3 in FIG. 2.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Shown in the drawing is a marine propulsion device 10, such as an outboard motor, including a power head 12 which houses an internal combustion engine 14 and a lower unit 16 having a gearcase 18 housing a reversible transmission or clutch 20. Extending through the lower unit 16 and operably connected to the internal combustion engine 14 is a drive shaft 22 carrying a beveled driving gear 24.

The transmission 20 includes a driven or propeller shaft 26 which is journaled in the gearcase 18 and is disposed transversely of the drive shaft 22. The propeller shaft 26 extends from the gearcase 18 and, on the outer end, carries a propeller 28. Located within the gearcase 18 is a pair of facing, axially spaced beveled drive gears 30 and 32 which are rotatably carried on the propeller shaft 26 and mesh with the drive gear 24.

As shown in FIG. 2, the transmission 20 also includes a shiftable propeller shaft driver 34 which carries clutch dogs 36 and 38 rotatable relative to the driver 34 and arranged for common axial movement therewith. The propeller shaft driver 34 is splined to the propeller shaft 26 to provide axial movement of the clutch dogs 36 and 38 into the drive gears 30 and 32 and to provide common rotation of the propeller shaft driver 34 with the propeller shaft 26. More specifically, the propeller shaft driver 34 includes a central bore having internal splines 40 which receives complementary external splines 42 provided on the propeller shaft 26 (See FIG. 3).

Provided on the outer face of each of the clutch dogs 36 and 38 are one or more driving lugs 44 which are arranged to engage complementary driving lugs 46 on the respective drive gears 30 and 32. Engagement of the clutch dog 36 with the drive gear 30 provides a forward drive condition and engagement of the clutch dog 38 with the drive gear 32 provides a reverse drive condition. When the propeller shaft driver 34 is in a neutral position, as shown in FIG. 2, neither of the clutch dogs 36 and 38 are engaged with the respective drive gears 30 and 32. Thus, the propeller shaft 26 is not rotated and a neutral drive condition exists.

Means are provided for selectively shifting the propeller shaft driver 34 to a position corresponding to the desired drive condition, i.e., for moving the propeller shaft driver 34 axially on the propeller shaft 26 to any of the above-described positions. While various arrangements can be used, in the specific construction illustrated, the outer surface of the propeller driver 34 includes thereon a radially extending circular guide 48 which is slidably received within a guideway (not shown) provided in the diametrically opposed arms or legs 50 of a yoke 52 (See FIG. 3). The yoke 52 is operably connected to a rocker arm 54 which in turn is connected to an actuating rod 56 (See FIG. 2). The actuating rod 56 extends through the lower unit 16 and is actuated by a remote control lever (not shown) to cause the propeller shaft driver 34 to move axially between forward, neutral and reverse positions while simultaneously affording rotary movement of the propeller shaft driver guide 48 relative to the yoke 52.

In accordance with the invention and in order to reduce the shock or impact load imposed on the drive lugs 44 of the clutch dogs 36 and 38 upon initial engagement with the respective drive gears 30 and 32, means are provided for reducing the rate at which the clutch dogs 36 and 38 apply torque to the propeller shaft driver 34. More specifically, means are provided for rotatably drivingly connecting each of the clutch dogs 36 and 38 to the propeller shaft driver 34 whereby, during initial application of torque to the propeller shaft driver 34 by a clutch dog after engagement with the corresponding drive gear, a flexible connection is provided between the clutch dog and the propeller shaft driver to thereby permit some relative rotation therebetween and whereby, after the initial application of torque, a rigid connection is provided between the clutch dog and the propeller shaft driver.

While various arrangments can be used, in this specific construction illustrated, the propeller shaft driver 34 comprises a member having a central, radially extending, enlarged circular portion 58 defining spaced radial shoulders 60 and 62 and opposed cylindrical sleeve portions 64 and 66 extending axially from the shoulders 60 and 62 (See FIG. 2). The yoke engaging guide 48 is carried on the periphery of the circular portion 58.

Each of the clutch dogs 36 and 38 includes a cylindrical body section 68 and 70 which extends axially from the respective driver shoulders 60 and 62 and include a central bore rotatably received on the corresponding sleeve portion 64 and 66 of the propeller shaft driver 34. Located on each of the sleeve portions 64 and 66, adjacent the outer end of the body sections 68 and 70, is a retainer means, such as a snap ring 72, for retaining the clutch dogs 36 and 38 on the sleeve portions 64 and 66. The clutch dogs 36 and 38 also include respective radially extending circular flanges 74 and 76 which are spaced axially from the corresponding shoulders 64 and 66 and carry the drive lugs 44.

Connected between the clutch dog flange 74 and the enlarged portion 58 of the propeller shaft driver 34 and encircling the clutch dog body section 68 is a spirally wound torsion spring 78. The inner end of the torsion spring 78 includes a tang 80 which fits into a radially extending slot 82 provided in the circular portion 58 of the propeller shaft driver 54 and the outer end of the torsion spring 78 includes a tang 84 which fits into an axially extending slot 86 provided in the clutch dog flange 74. Connected between the clutch flange 76 and the enlarged portion 58 of the propeller shaft driver 34 and encircling the clutch dog body section 68 is another spirally wound torsion spring 88 which, like the torsion spring 78, includes on the opposite ends tangs 90 and 92 which respectively fit into a radially extending slot 94 provided in the enlarged portion 58 of the propeller shaft driver 34 and an axially extending slot 96 provided in the clutch dog flange 76. The spiral windings of the torsion springs 78 and 88 are such that, upon rotation of the clutch dogs 36 and 38 after being drivingly engaged with the corresponding drive gears 30 and 32, the springs are wrapped-up, i.e., wound tighter.

The clutch dogs 36 and 38 operate in the same manner, so only the operation of the clutch dog 36 will be described in detail. When the propeller shaft driver 34 is moved to the drive position, the drive lugs 44 of the clutch dog 36 are moved into driving engagement with the drive lugs 46 of the drive gear 30. During the initial rotation of the clutch dog 36 by the drive gear 30, the torsion spring 78 begins to wrap-up and also begins to transmit torque to the propeller shaft driver 34 and, thus, to the propeller shaft 26. The rotational movement required to wrap-up spring 78 produces some relative rotation between the clutch dog 36 and the propeller shaft driver 34 such that the clutch dog 36 does not initially transmit full torque to the propeller shaft driver 34. When the spring 78 becomes completely wrapped-up, a substantially rigid connection is established between clutch dog 36 and the propeller shaft driver 34 and full torque is thereafter transmitted by the clutch dog 36 to the propeller shaft driver 34. Thus, the initial impact or shock on the drive lugs 44 of the clutch dog 36 is relatively low because of the resultant gradual change from a no-load or no-torque to a full-load or full-torque condition on the clutch dog 36 as the spring 78 wraps-up.

In the preferred embodiment shown in FIG. 2, means are provided for further reducing rate at which each of the clutch dogs 36 and 38 initially apply torque to the propeller shaft driver 34. The springs 78 and 88 are supported on respective elongated tubular pads or cushions 98 and 100 which are made from a resilient material, such as rubber, and are located in the respective spacings between the clutch dog flanges 74 and 76 and the propeller shaft driver shoulders 60 and 62. The resilient spring cushions 98 and 100 have a longitudinal dimension somewhat less than the axial spacing between the corresponding clutch dog flange and propeller shaft driver shoulder so that they can expand axially upon being compressed. Thus, for instance, as the spring 78 becomes wrapped up as described above, the resilient spring cushion 98 is squeezed or compressed until it resists further deflection, thereby establishing a rigid connection between the clutch dog 36 and the propeller shaft driver 34. The additional relative rotation between a clutch dog 36 and a propeller shaft driver 34 during the time the spring cushion 98 is being compressed by the spring 78, further delays the time between a no-load or no-torque and a full-load or full-torque condition on the clutch dog 36 after initial engagement with the drive gear 30. Thus, the initial shock or impact load on the drive lugs 44 of the clutch dog 36 is reduced further.

Although the transmission of the invention has been described for use in a marine propulsion device, it should be understood that it can be used in other similar applications.

Various of the features of the invention are set forth in the following claims.

What is claimed is:

1. A marine propulsion device comprising a lower unit having a rotatably mounted drive shaft provided with a driving gear, a propeller shaft rotatably mounted in said lower unit and carrying a propeller, a drive gear rotatably carried on said propeller shaft and disposed in meshing engagement with said driving gear, a propeller shaft drive means carried on said propeller shaft for axial movement relative to said propeller shaft and for common rotation with said propeller shaft, a clutch dog mounted on said propeller shaft drive means for rotation relative thereto and for common axial movement with said propeller drive shaft means into a position drivingly connecting said clutch dog with said drive gear for common rotation, means for selectively moving said propeller shaft drive means axially on said propeller shaft to move said clutch dog relative to said position, and means for connecting said clutch dog to said propeller shaft drive means for rotation of said drive means in response to rotation of said clutch dog.

2. A marine propulsion device according to claim 1 wherein said means for connecting said clutch dog to said propeller shaft drive means includes a spirally wound torsion spring affixed at the opposite ends to said clutch dog and said propeller shaft drive means and in encircling relation to said propeller shaft, said torsion spring being disposed so as to be gradually wound tighter during the initial rotation of said clutch dog after engagement with said drive gear and to eventually become tightly wound during continued rotation of said clutch dog to thereby provide a substantially rigid connection between said clutch dog and said propeller shaft drive means.

3. A marine propulsion device according to claim 2 including a resilient cushion located beneath said spring for supporting said spring and adapted to be compressed by said spring as said spring becomes tightly wound.

4. A marine propulsion device according to claim 2 wherein said propeller shaft drive means comprises a member including an axially extending, cylindrical sleeve portion, a circular portion extending radially outwardly from said sleeve portion and defining a radial shoulder, and a central aperture for receiving said propeller shaft, said clutch dog comprises a member including an axially extending, cylindrical body section having a central bore rotatably received on the sleeve portion of said propeller shaft drive means, and a circular flange which extends radially outwardly from said body, is axially spaced from the radial shoulder of said propeller shaft drive means, and carries means for drivingly connecting said clutch dog to said drive gear, and said torsion spring encircles the body section of said clutch dog and is affixed at the opposite ends to the circular portion of said propeller shaft drive means and said clutch dog flange.

5. A marine propulsion device according to claim 4 including an elongated tubular, resilient cushion located on the body section of said clutch dog for supporting said spring, said cushion having a longitudinal dimension less than the axial spacing between the shoulder of said propeller shaft drive means and said clutch dog flange.

6. A marine propulsion device including a lower unit having a drive shaft provided with a driving gear, a propeller shaft rotatably mounted in said lower unit and carrying a propeller, a pair of axially spaced drive gears rotatably carried on said propeller shaft and disposed in meshing engagement with said driving gear, a propeller shaft driver carried on said propeller shaft between said drive gears for axial movement relative to said propeller shaft and for common rotation with said propeller shaft, said propeller shaft driver comprising a generally cylindrical member including a radially outwardly extending, circular central portion defining axially spaced radial shoulders, and oppositely directed cylindrical sleeve portions extending axially from said central portion shoulders, and a central bore for receiving said propeller shaft, a clutch dog rotatably mounted on each of the sleeve portions of said propeller shaft driver for common axial movement with said propeller shaft driver into selective engagement with respective of said drive gears, each of said clutch dogs comprising a member including a central bore for rotatably receiving a sleeve portion of said propeller shaft driver, a cylindrical body section, and a circular flange which extends radially outwardly from said body section and is axially spaced from the corresponding shoulder of said propeller shaft driver, drive lugs on each of said clutch dog flanges which are engageable with the drive lugs of the corresponding drive gears, in response to selective axial movement of said propeller shaft driver on said propeller shaft, to drivingly connect a corresponding clutch dog and drive gear for common rotation, a spirally wound, torsion spring encircling each of said clutch dog body sections and affixed at the opposite ends to the central portion of said propeller shaft driver and the to the central portion of said propeller shaft driver and the corresponding clutch dog flange, said springs being more tightly wound when the corresponding clutch dog and drive gear are drivingly connected, and means for selectively moving said propeller shift driver axially on said propeller shaft to respectively drivingly engage said clutch dogs.

7. A marine propulsion device according to claim 6 further including an elongated tubular resilient cushion located on the body section of each of said clutch dogs for respectively supporting said springs, said cushions having a longitudinal dimension less than the respective axial spacing between said propeller shaft driver shoulder and said clutch dog flange.

8. A transmission including a driven shaft, a drive gear carried on said driven shaft and adapted for connection to a source of power, and drive gear including one or more drive lugs, a drive means carried on said driven shaft for axial movement relative to said driven shaft and for common rotation with said driven shaft, a clutch dog rotatably mounted on said shaft drive means for rotation relative thereto an for common axial movement with said drive means into a position drivingly connecting said clutch dog with said drive gear for common rotation, means for selectively moving said shaft drive means axially on said driven shaft to move said clutch dog relative to said position, and means for connecting said clutch dog to said shaft drive means for rotation of said drive means in response to rotation of said clutch dog.

9. A transmission according to claim 8 wherein said means for connecting said clutch dog to said shaft drive means includes a spirally wound torsion spring affixed at the opposite ends to said clutch dog and said shaft drive means and in encircling relation to said driven shaft, said torsion spring being disposed so as to be gradually wound tighter during the initial rotation of said clutch dog after engagement with said drive gear and to eventually become tightly wound during continued rotation of said clutch dog to thereby provide a substantially rigid connection between said clutch dog and said shaft drive means.

10. A transmission according to claim 9 including a resilient cushion located beneath said spring for supporting said spring and adapted to be compressed by said spring as said spring becomes tighly wound.

* * * * *

PO-1050
(5/69)

UNITED STATES PATENT OFFICE
CERTIFICATE OF CORRECTION

Patent No. __3,842,788__    Dated __October 22, 1974__

Inventor(s) __Raymond A. Kroll__

It is certified that error appears in the above-identified patent and that said Letters Patent are hereby corrected as shown below:

| | |
|---|---|
| Column 4, line 61, | after "clutch", insert ---dog---. |
| Claim 6, lines 25 and 26, | after "ends", delete "to the central portion of said propeller shaft driver and the". |
| Claim 8, line 6, | "and" should be -- said --. |
| Claim 8, line 11, | "an" should be ---and---. |
| Claim 10, line 36, | "tighly" should be ---tightly---. |

Signed and Sealed this second Day of September 1975

[SEAL]

Attest:

RUTH C. MASON
Attesting Officer

C. MARSHALL DANN
Commissioner of Patents and Trademarks